(12) United States Patent  
Muramatsu

(10) Patent No.: US 7,965,588 B2
(45) Date of Patent: Jun. 21, 2011

(54) OPTICAL DISK APPARATUS

(75) Inventor: Keiichi Muramatsu, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1358 days.

(21) Appl. No.: 11/497,345

(22) Filed: Aug. 2, 2006

(65) Prior Publication Data

US 2007/0033300 A1 Feb. 8, 2007

(30) Foreign Application Priority Data

Aug. 2, 2005 (JP) ................... 2005-224365

(51) Int. Cl.
G06F 3/00 (2006.01)
(52) U.S. Cl. ...... 369/30.36; 369/14; 369/20; 369/29.02; 369/53.37; 369/70
(58) Field of Classification Search ............. 369/14, 369/47.1, 47.15, 273, 53.11, 20, 29.02, 30.01, 369/30.26, 30.29, 30.46, 53.37, 70
See application file for complete search history.

(56) References Cited

U.S. PATENT DOCUMENTS

| 5,951,462 | A * | 9/1999 | Yamanaka ............... 600/118 |
| 6,026,068 | A * | 2/2000 | Obata et al. ............ 369/53.2 |
| 7,328,285 | B2 * | 2/2008 | Encinas et al. ............. 710/8 |
| 2003/0058765 | A1 * | 3/2003 | Schreurs et al. .......... 369/47.53 |
| 2006/0077845 | A1 * | 4/2006 | Nakai ..................... 369/53.22 |
| 2006/0256686 | A1 * | 11/2006 | Torii ....................... 369/53.37 |
| 2006/0262682 | A1 * | 11/2006 | Hattori et al. ............. 369/47.12 |
| 2007/0253316 | A1 * | 11/2007 | Ferren et al. ................. 369/273 |

FOREIGN PATENT DOCUMENTS

| JP | 04-102952 | 4/1992 |
| JP | 06-309265 | 11/1994 |
| JP | 08-320767 | 12/1996 |
| JP | 09-017167 | 1/1997 |
| JP | 2000-048449 | 2/2000 |
| JP | 2001-022679 | 1/2001 |
| JP | 2004-032672 | 1/2004 |
| JP | 2005-092392 | 4/2005 |

* cited by examiner

*Primary Examiner* — Wayne R Young
*Assistant Examiner* — Dionne H Pendleton
(74) *Attorney, Agent, or Firm* — Pillsbury Winthrop Shaw Pittman, LLP

(57) ABSTRACT

An optical disk apparatus includes an I/O port that connects to a port of a drive apparatus, and a storage unit that prestores manufacturing information in correspondence with device drivers. The optical disk apparatus further includes a controller that transmits a command indicating to return manufacturing information, to the drive apparatus via the I/O port. When manufacturing information is returned from the drive apparatus via the I/O port, the controller extracts a device driver corresponding to the returned manufacturing information from the device drivers in the storage unit. The controller then controls a reading operation or a recording operation of the drive apparatus on the optical disk, based on the extracted device driver.

4 Claims, 6 Drawing Sheets

| MANUFACTURING INFORMATION OF DRIVE APPARATUS | TYPE OF OPTICAL DISK THAT DRIVE APPARATUS CAN HANDLE | DEVICE DRIVER OF DRIVE APPARATUS | CURRENTLY SET DRIVE APPARATUS |
|---|---|---|---|
| .... | .... | .... | .... |
| (COMPANY A) MODEL NO.: 100 | DVD-R, DVD-RW, READ-ONLY OPTICAL DISK | PROGRAM A | ○ |
| (COMPANY B) MODEL NO.: 101 | DVD+R, DVD+RW, READ-ONLY OPTICAL DISK | PROGRAM B | — |
| (COMPANY A) MODEL NO.: 102 | READ-ONLY OPTICAL DISK | PROGRAM C | — |
| (COMPANY C) MODEL NO.: 103 | DVD-RAM, READ-ONLY OPTICAL DISK | PROGRAM D | — |
| .... | | .... | .... |

FIG.4

OPTICAL DISK APPARATUS

CROSS REFERENCE

This Nonprivisional application claims priority under 35 U.S.C. §119(a) on Patent Application No. 2005-224365 filed in Japan on Aug. 2, 2005, the entire contents of which are hereby incorporated by reference.

BACKGROUND OF THE INVENTION

The present invention relates to an optical disk apparatus for connecting to a detachable drive apparatus that reads data recorded on an optical disk such as a DVD (Digital Versatile Disk) or a CD (Compact Disk) and records data.

Conventionally, optical disk apparatuses that record data such as video and audio, and read (playback or reproduce) recorded data with respect to optical disks such as CD and DVD have become commercially viable and are in widespread use.

These optical disks include CD-R, DVD-R, DVD+R, DVD-RAM, CD-RW and DVD-RW for recording (hereinafter, "recordable optical disk"), and CD-ROM and DVD-ROM for playback only (hereinafter, "read-only optical disk"). Further, recordable optical disks include write-once optical disks such as CD-R, DVD-R and DVD+R, and rewritable optical disks such as DVD-RAM, CD-RW, DVD+RW and DVD-RW.

Thus, there exist many different types of optical disk.

On the other hand, disk playback apparatuses such as that disclosed in JP H9-17167A have been proposed.

However, conventional optical disk apparatuses are dependent on the type of optical disk. In other words, the type of optical disk that conventional optical disk apparatuses can handle is limited. For example, some optical disk apparatuses can only record to DVD-R and DVD-RW, while other optical disk apparatuses can only record to DVD+R and DVD+RW.

Thus, a problem with conventional optical disk apparatuses is that the user may not be able to read or record data, depending on the type of optical disk.

Therefore, the user must gain an awareness of the type of optical disk that his or her optical disk apparatus can handle before loading an optical disk into the optical disk apparatus. Consequently, with conventional optical disk apparatuses, the user has to worry about the type of optical disk that his or her optical disk apparatus can handle.

Moreover, the type of optical disk that the apparatus shown in JP H9-17167A can handled is limited to CD. Consequently, this apparatus has the same problem as the above conventional disk apparatuses.

An object of the present invention is to provide an optical disk apparatus configured so as to handle any type of optical disk.

SUMMARY OF THE INVENTION

An optical disk apparatus according to the present invention includes an input/output port that connects to the port of a drive apparatus for loading an optical disk.

The optical disk apparatus also includes a storage unit that prestores manufacturing information relating to manufacture of the drive apparatus and a plurality of device drivers corresponding to the manufacturing information, one of the device drivers controlling, from the optical disk apparatus, a reading operation or a recording operation of the drive apparatus on the optical disk. In this configuration, the manufacturing information shows, for example, the model name of the drive apparatus, the product name of the drive apparatus, the model number of the drive apparatus, or the manufacturer of the drive apparatus. The device driver is a program for controlling the drive apparatus from the optical disk apparatus.

The optical disk apparatus further includes a controller that transmits a command to the drive apparatus via the input/output port when connection of the drive apparatus to the input/output port is detected, the command indicating to return manufacturing information. In this configuration, the drive apparatus prestores manufacturing information relating to itself.

When manufacturing information is returned from the drive apparatus via the input/output port, the controller extracts a device driver corresponding to the returned manufacturing information from the device drivers in the storage unit.

The controller then controls the reading operation or the recording operation of the drive apparatus on the optical disk, based on the extracted device driver.

In the above configurations, the type of optical disk that a drive apparatus can itself handle is limited. However, the optical disk apparatus can handle any type of optical disk as a result of the user interchanging drive apparatuses.

BRIEF DESCRIPTION OF THE DRAWINGS

FIG. 4 shows the content stored in a storage unit of an optical disk apparatus according to an embodiment of the present invention.

FIG. 5 is a flowchart showing an operation performed by a controller of an optical disk apparatus according to an embodiment of the present invention when power is turned on.

DETAILED DESCRIPTION OF THE INVENTION

An optical disk apparatus according to an embodiment of the present invention is described below.

Figure 1:
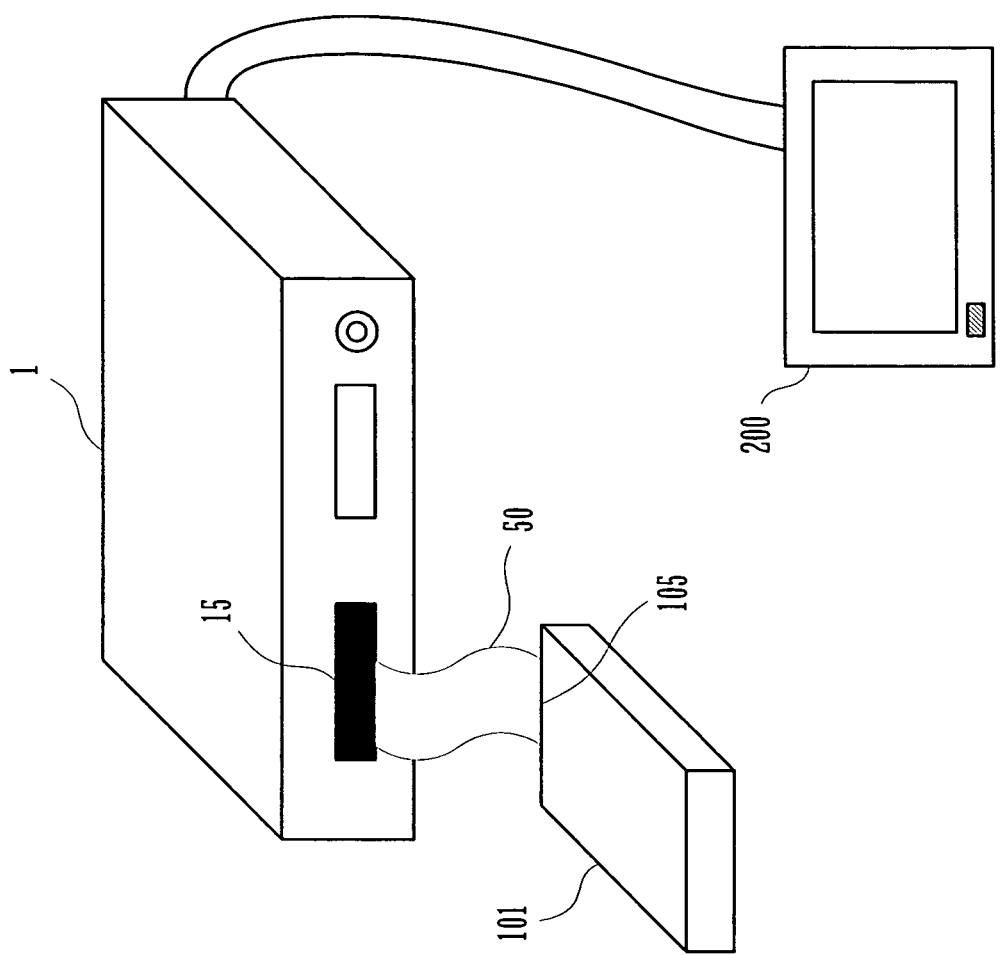
FIG. 1 shows an overview in which a drive apparatus is connected to an optical disk apparatus according to an embodiment of the present invention.

FIG. 1 shows an overview in which a drive apparatus is connected to the optical disk apparatus of the present embodiment. An optical disk apparatus 1 is a DVD recorder, for example. The optical disk apparatus 1 is connected to a television 200 via an interface. The optical disk apparatus 1 includes an input/output (I/O) port 15 whose interface standard is ATAPI (AT Attachment Packet Interface).

On the other hand, a drive apparatus 101 is a general-purpose drive apparatus used with personal computers (PCs) and the like. The drive apparatus 101 includes a port 105 whose interface standard is ATAPI.

The I/O port 15 of the optical disk apparatus 1 is connected via an ATAPI cable 50 to the port 105 of the drive apparatus 101, which is for loading an optical disk.

The drive apparatus 101 is thus detachable from the optical disk apparatus 1. Here, other drive apparatuses can be connected to the optical disk apparatus 1, provided the interface standard is ATAPI, the same as the I/O port 15 of the optical disk apparatus 1.

Note that although ATAPI is given as the interface standard in the present embodiment, ATAPI is, to be precise, merged with ATA (AT Attachment) to form ATA/ATAPI-4. Further, USB, SCSI and the like are also acceptable apart from ATAPI in actual implementation.

Figure 2:
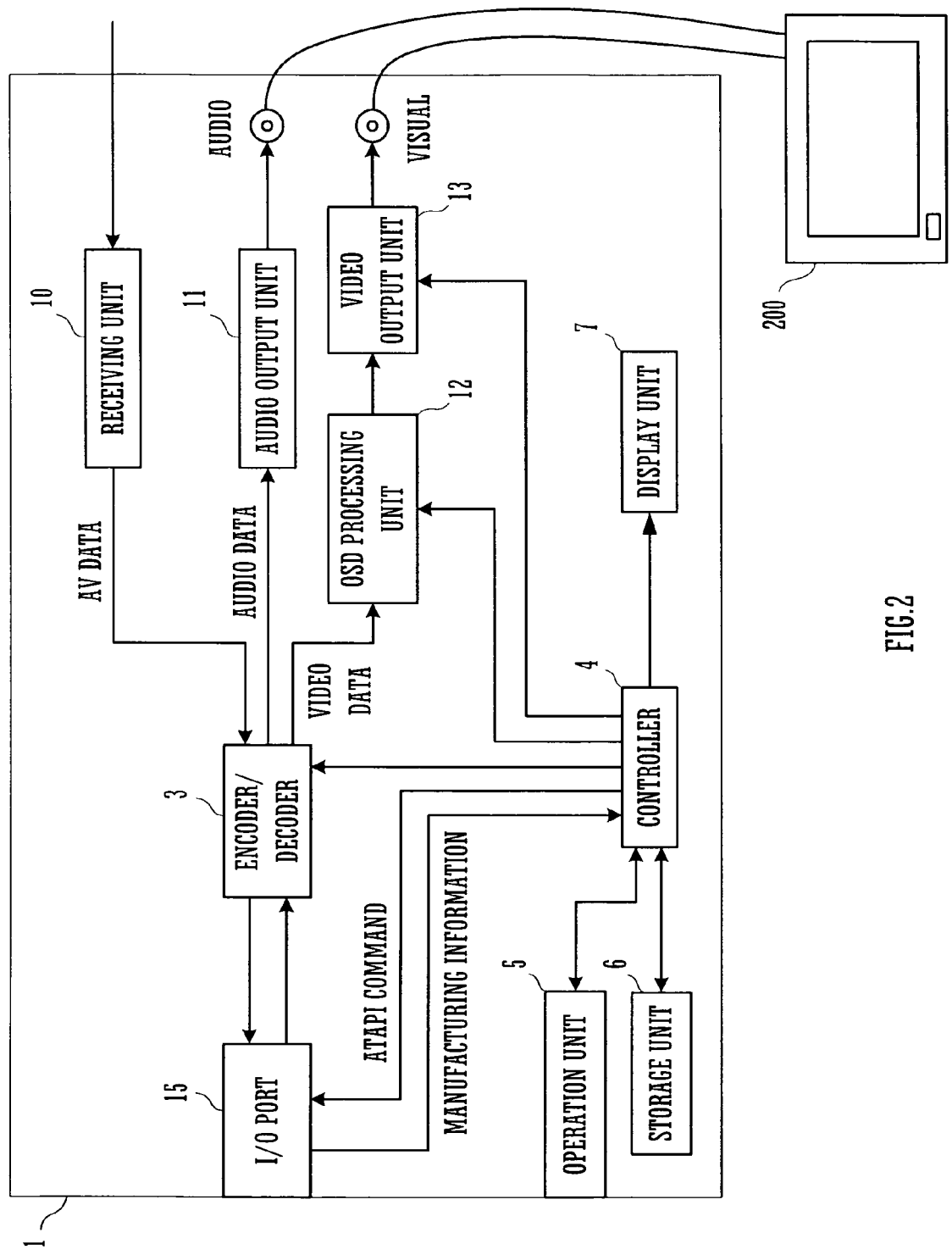
FIG. 2 is a block diagram showing the principal configuration of an optical disk apparatus according to an embodiment of the present invention.

FIG. 2 is a block diagram showing the principal configuration of the optical disk apparatus of the present embodiment. The optical disk apparatus 1 includes a controller 4 that controls the optical disk apparatus 1, an operation unit 5 that is provided with a play key, an audio recording key, and a video recording key, a display unit 7 that displays information, a storage unit 6, an encoder/decoder 3 that encodes/decodes video and audio data, an audio output unit 11 that converts audio data to analog audio signals, an OSD processing unit 12 that generates OSD (On Screen Display) graphics, a video output unit 13 that converts video data to analog video signals, a receiving unit 10 that acquires data by receiving TV broadcast signals or the like, and the I/O port 15 for connecting to the ATAPI cable 50.

Figure 3:
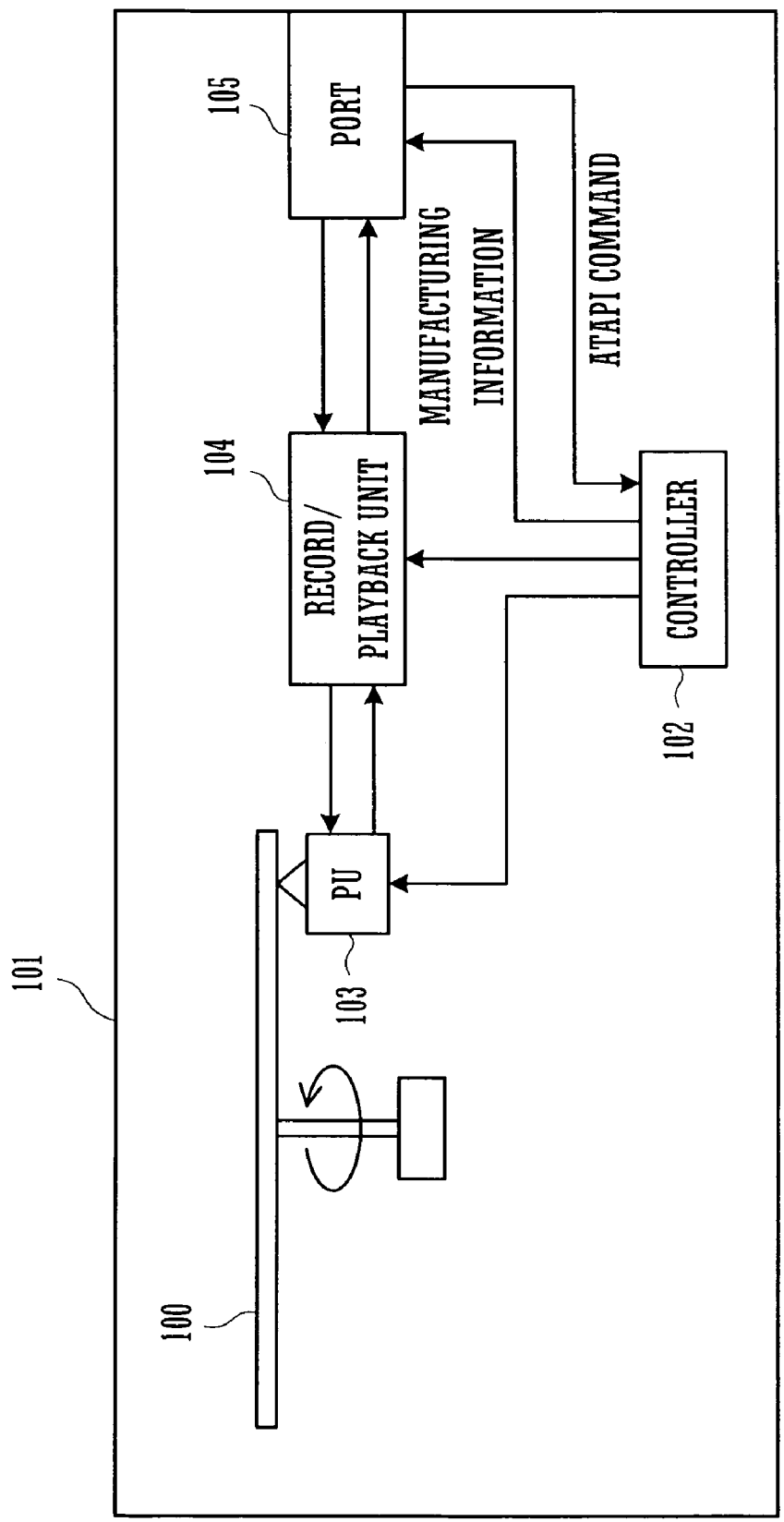
FIG. 3 is a block diagram showing the principal configuration of a drive apparatus.

FIG. 3 is a block diagram showing the principal configuration of the drive apparatus.

The drive apparatus 101 includes a controller 102 that controls the drive apparatus 101, a pickup head 103 (hereinafter, "PU head 103") for recording and reading data with respect to a DVD 100, a record/playback unit 104 such as an RF amplifier, and the port 105 for connecting to the ATAPI cable 50.

Note that the drive apparatus 101 is shown in the manufacturing information to be a model 100 drive apparatus made by Company A (see FIG. 4 described hereinafter). Drive apparatuses made by companies B and C, and Company A's model 102 drive apparatus shown in FIG. 4 have a similar configuration to the drive apparatus 101.

The PU head 103 includes a laser diode (LD), a collimator lens, a beam splitter, an objective lens, a photodetector, a thread motor, and an actuator, all of which are not shown in the drawings.

The PU head 103 is movably attached to an axis that extends in a radial direction of the DVD 100. The thread motor moves the PU head 103 in a radial direction of the DVD 100.

The LD is a light source that outputs a laser beam. The photodetector is composed of a plurality of light-receiving elements, and detects light reflected from the DVD 100. The light-receiving area of the photodetector is divided substantially uniformly into quarters, for example, to form four light-receiving areas.

The objective lens adjusts the irradiation position of the laser beam on the DVD 100. The actuator moves the objective lens toward and away from the DVD 100, and in a radial direction of the DVD 100.

During playback, the PU head 103 irradiates a laser beam of reading power onto the DVD 100, and detects the light reflected from the DVD 100 with the photodetector. Thus, the drive apparatus 101 optically reads information recorded on the DVD 100.

During playback, the record/playback unit 104 generates an RF signal based on the output of the plurality of light receiving elements in the PU head 103, and amplifies the RF signal. The RF signal is a read signal. The record/playback unit 104 processes the amplified RF signal to extract data, and outputs the extracted data.

The data output from the record/playback unit 104 is input to the I/O port 15 of the optical disk apparatus 1 (see FIG. 2) via the ATAPI cable 50 connected to the port 105 (see FIG. 1). This data is then input from the I/O port 15 to the encoder/decoder 3 of the optical disk apparatus 1.

Returning now to FIG. 2, the encoder/decoder 3 separates the input data into video and audio data. Here, the extracted video and audio data is encoded with MPEG, for example. The encoder/decoder 3 decodes the video and audio data. The encoder/decoder 3 then outputs the audio data to the audio output unit 11 and the video data to the OSD processing unit 12 while synchronizing the data.

Note that if the drive apparatus connected to the optical disk apparatus 1 has a decoding function, the video and audio data are input to the encoder/decoder 3 in a decoded state. In this case, the encoder/decoder 3 outputs the data as is, without performing the above decoding. Whether or not the drive apparatus connected to the optical disk apparatus 1 has a decoding function is written in advance into the device driver shown in FIG. 4, and judged by the controller 4 checking this description.

The OSD processing unit 12 incorporates an OSD graphics memory (not shown).

The OSD processing unit 12 generates OSD graphics using OSD graphics data such as a setting menu screen or the like stored in the OSD graphics memory, based on a control signal sent from the controller 4. Further, the OSD processing unit 12 generates a composite image by overlaying the generated OSD graphics on video based on the video data input from the encoder/decoder 3. The OSD processing unit 12 then outputs video data or the video data of the composite image to the video output unit 13.

The video output unit 13 converts the video data input from the OSD processing unit 12 to an analog video signal, and outputs the video signal. The video output unit 13 is connected to the television 200. The video output unit 13 outputs a video signal compatible with the connected television 200.

The audio output unit 11 converts the audio data input from the encoder/decoder 3 to an analog audio signal, and outputs the audio signal. The audio output unit 11 is connected to the television 200.

The user is then able to watch video based on the video signal and listen to audio based on the audio signal output from the optical disk apparatus 1 on television 200.

On the other hand, the receiving unit 10 has a tuner for extracting, from the antenna of a TV broadcast or the like, broadcast signals in a frequency band corresponding to a selected channel. During recording, the receiving unit 10 receives a TV broadcast signal, A/D converts the received signal, and outputs the converted signal.

Note that the above tuner may be an analog tuner for receiving analog broadcasts, or a digital tuner for receiving digital broadcasts. Also, a tuner that is both analog and digital may be provided in the receiving unit 10.

During recording, the encoder/decoder 3 converts data input from the receiving unit 10 to a data format for recording to the DVD 100. For example, the encoder/decoder 3 encodes the video and audio data of the program with MPEG 2, and outputs the encoded data.

Note that if the drive apparatus connected to the optical disk apparatus 1 has an encoding function, the encoder/decoder 3 outputs the data as is, without performing the above encoding. Whether or not the drive apparatus connected to the optical disk apparatus 1 has an encoding function is written in advance into the device driver shown in FIG. 4, and judged by the controller 4 checking this description.

The data output from the encoder/decoder 3 is input to the port 105 of the drive apparatus 101 (see FIG. 3) via the ATAPI cable 50 connected to the I/O port 15 (see FIG. 1). This data is then input from the port 105 to the record/playback unit 104.

Proceeding now to FIG. 3, the record/playback unit 104 outputs a digital signal to the PU head 103.

When input of the digital signal from the record/playback unit 104 is received, the PU head 103 controls a laser beam of recording power according to this digital signal, and irradiates the laser beam onto the recording surface of the DVD 100.

Returning now to FIG. 2, the storage unit 6 is configured with an EEPROM or a hard disk, for example. The storage unit 6 stores the main control program.

FIG. 4 shows the content stored in the storage unit of the optical disk apparatus of the present embodiment. The storage unit 6 prestores a table. The table stores manufacturing information relating to manufacture of a drive apparatus and a plurality of device drivers corresponding to the manufacturing information, one of the device drivers controlling a playback (reading) operation or a recording operation of the drive apparatus from the optical disk apparatus 1. The table further stores a plurality of types of optical disk that the drive apparatus can handle, the types of optical disk corresponding to the manufacturing information. The manufacturing information shows the model number and manufacturer of the drive apparatus.

The controller 4 controls the drive apparatus connected thereto, using the device driver.

A flag is set to ON for the drive apparatus that is currently set. The drive apparatus currently set is Company A's model 100 drive apparatus 101.

Note that although the manufacturing information in the present embodiment shows the model number and manufacturer of the drive apparatus, the manufacturing information may in actual implementation show the model name, product name, and the like of the drive apparatus.

Returning now to FIG. 2, the display unit 7 is configured with a liquid crystal panel, for example, and displays the time, the setting status of the optical disk apparatus 1, and the like.

The operation unit 5 has a plurality of operation keys (not shown) for performing input operations on the optical disk apparatus, and a remote control receiving unit (not shown) that receives control code transmitted to the optical disk apparatus from a remote control not shown in the drawings. The operation unit 5 sends control code that depends on the operation key operated by the user and control code received by the remote control receiving unit to the controller 4.

The plurality of operation keys include an audio recording key (not shown) for recording audio to the DVD 100, a video recording key (not shown) for recording video and audio to the DVD 100, and a play key (not shown) for playing video and audio recorded on the DVD 100.

Note that playback, video recording, and audio recording are used in the description of the present embodiment as being representative of reading and recording.

The controller 4 is configured with a microcomputer, for example. Further, the controller 4 incorporates a RAM as a work field in which to develop the above main control program and the like.

The controller 4 controls the operation of the various units in the optical disk apparatus based on the control code sent by the operation unit 5.

Note that with an actual drive apparatus, a tracking servo control for aligning the irradiation position of the laser beam to the center of the tracks on the optical disk, and a focus servo control for aligning the focal position of the laser beam on the recording surface of the optical disk are performed during reading and recording. However, illustration of these controls is omitted in the embodiments of the present invention.

Here, the display unit 7 and the television 200 equate to the "display device" of the present invention. The controller 4 and the OSD processing unit 12 equate to the "controller" of the present invention.

Figure 5:
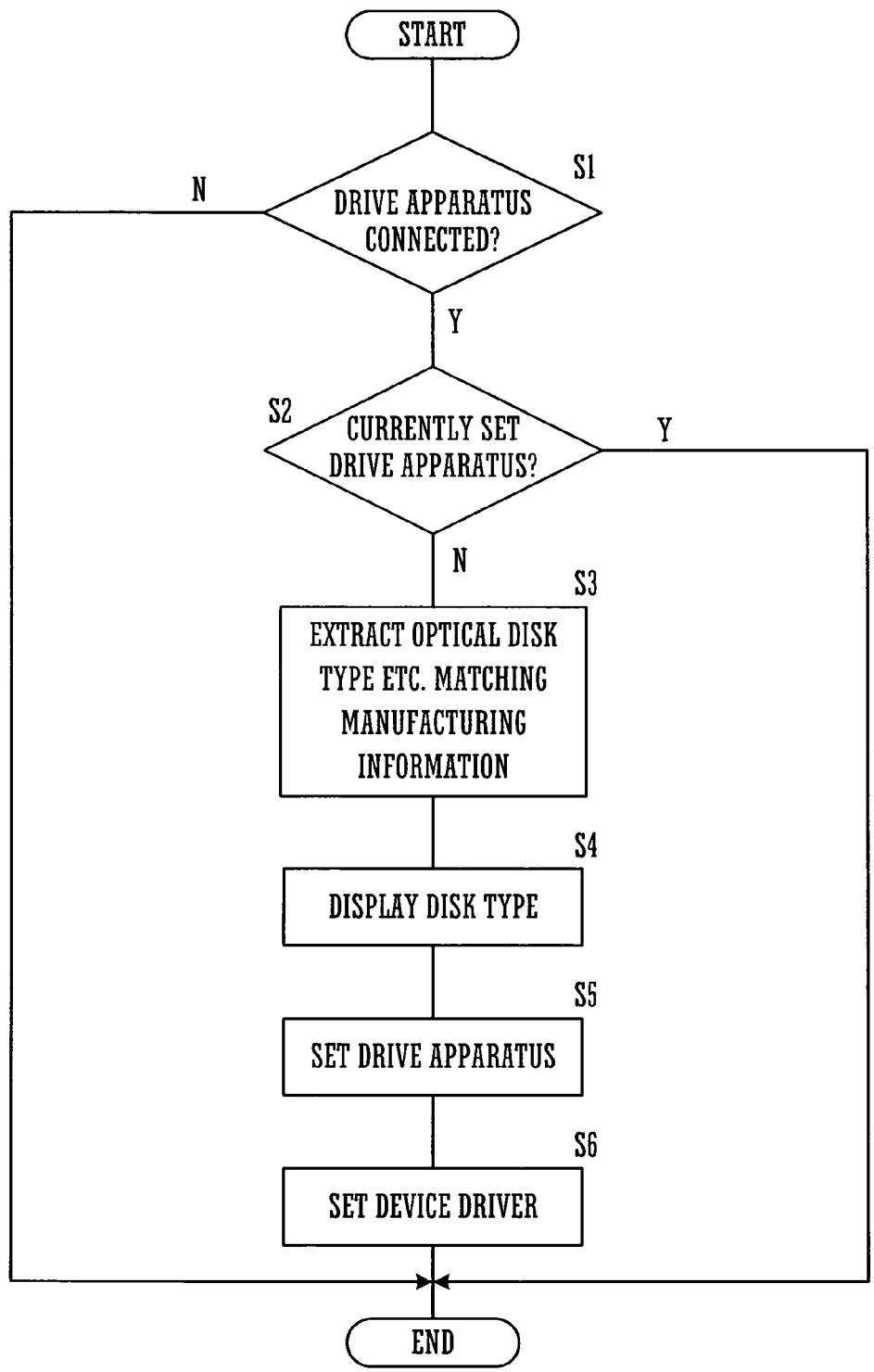

FIG. 5 is a flowchart showing an operation performed by the controller in the optical disk apparatus of the present embodiment when power is turned on. When the optical disk apparatus 1 is turned on, the controller 4 checks whether a drive apparatus is connected to the I/O port 15 (S1).

Note that although the controller 4 checks (detects) for the connection of a drive apparatus when power is turned on in the present embodiment, this processing is not limited to when power is turned on. The controller 4 may detect whether a drive apparatus is connected to the I/O port 15 when the play key, video recording key, or audio recording key is depressed. Here, if the interface standard is USB (Universal Serial Bus), the controller 4 generally detects whether a drive apparatus is connected to the I/O port 15 when power is turned on or when drive apparatuses are interchanged.

Having detected in S1 that a drive apparatus is not connected to the I/O port 15, the controller 4 ends the processing. The controller 4 reverts to standby mode as a result, and waits for an instruction from the user.

On the other hand, having detected in S1 that a drive apparatus is connected to the I/O port 15, the controller 4 judges whether the connected currently drive apparatus is the drive apparatus that is currently set (the drive apparatus 101 in the present embodiment) (S2). This judgment is performed by the controller 4 acquiring manufacturing information from the drive apparatus that is currently connected, and judging whether the acquired manufacturing information matches the manufacturing information in the row of the table in the storage unit 6 in which the flag is set to ON (see "O" in FIG. 4).

The method of acquiring manufacturing information is described in detail here using FIG. 2 and FIG. 3. As shown in FIG. 2, the controller 4 generates an ATAPI command indicating to return manufacturing information, and outputs the generated ATAPI command to the I/O port 15. The ATAPI command is input to the controller 102 via the I/O port 15, the ATAPI cable 50, and the port 105 in order (see FIG. 3). The controller 102, being compatible with the ATAPI standard, receives the ATAPI command, and outputs the manufacturing information of the drive apparatus 101 stored in an internal memory (not shown) to the port 105. The manufacturing information is input to the controller 4 via the port 105, the ATAPI cable 50, and the I/O port 15 in order. Thus, the controller 4 acquires manufacturing information from the drive apparatus.

Note that the above manufacturing information is returned from the drive apparatus because the interface standard of both the port of the drive apparatus and the I/O port 15 is ATAPI.

Also, although manufacturing information is acquired using an ATAPI command in the present embodiment, manufacturing information would be acquired using a USB command if the interface standard was USB. In the case of USB, manufacturing information can be acquired with a similar processing flow to ATAPI. The same applies to SCSI.

If the two pieces of manufacturing information match in S2, that is, if the currently connected drive apparatus is the same as the currently set drive apparatus, the controller 4 ends the processing. The controller 4 reverts to standby mode as a result, and waits for an instruction from the user. Thus, the controller 4 is able to execute the device driver (program A) of the drive apparatus 101 set from the previous usage as soon as the optical disk apparatus 1 is turned on, and quickly activate the drive apparatus 101 from the optical disk apparatus 1 (see "O" in FIG. 4).

Thus, even if there is an instruction from the user as soon as the optical disk apparatus 1 is turned on, the controller 4 simply executes the device driver (program A) of the drive apparatus 101 set from the previous usage, thereby enabling the drive apparatus 101 to be quickly activated from the optical disk apparatus 1, given that the processing from S3 to S6 described hereinafter is not performed (see "O" in FIG. 4).

Note that at this time, the controller 4 may revert to standby mode after controlling the television 200 to on-screen display the type of optical disk that the drive apparatus 101 handles, as in S4 described hereinafter.

On the other hand, if the two pieces of manufacturing information do not match in S2, that is, if the currently connected drive apparatus is not the set drive apparatus 101, the controller 4 extracts a device driver of the currently connected drive apparatus and a type of optical disk that the drive apparatus can handle from the table (see FIG. 4) in the storage unit 6, based on the returned manufacturing information (S3). For example, if the returned manufacturing information shows model 101 of Company B, the controller 4 extracts program B and the type of optical disk (DVD+R, DVD+RW, read-only optical disk).

The controller 4 sends a control signal to the OSD processing unit 12 indicating to on-screen display the extracted type of optical disk on the television 200 (S4). Thus, the OSD processing unit 12 on-screen displays the type of optical disk on the television 200. For example, if the returned manufacturing information shows model 101 of Company B, DVD+R, DVD+RW, and read-only optical disk are on-screen displayed on the television 200.

Thus, the user is able to find out via the television 200 what type of optical disk the connected drive apparatus can handle.

Note that although the type of compatible optical disk is displayed on the television 200 as the display device in the present embodiment, the display unit 7 may perform this display.

Next, the controller 4 sets the currently connected drive apparatus in the table of the storage unit 6 as the currently set drive apparatus (S5). Specifically, the controller 4 sets the flag of the currently connected drive apparatus to ON (see FIG. 4). For example, if the returned manufacturing information shows model 101 of Company B, the controller 4 sets the flag of the cell to the right of "Program A" to OFF, and sets the flag of the cell to the right of "Program B" to ON (see FIG. 4). Next time power is turned on, the S2 judgment will be performed on the basis of the manufacturing information in the row in which this flag is set to ON.

The controller 4 sets the extracted device driver (S6), and ends the processing. The controller 4 reverts to standby mode as a result, and waits for an instruction from the user. For example, if the returned manufacturing information shows model 101 of Company B, the controller 4 removes program A from the settings and sets program B. Specifically, the controller 4 uninstalls program A from the main control program, and installs program B in the main control program.

When the play key, video recording key, or audio recording key of the operation unit 5 is depressed, the controller 4 controls the playback (reading) operation or recording operation of the drive apparatus from the optical disk apparatus 1 based on the device driver that has been set.

As described above, the controller 4 is able to control the drive apparatus from the optical disk apparatus 1 to perform a playback (reading) operation or a recording operation, even when the user interchanges drive apparatuses.

Here, the type of optical disk that a drive apparatus can itself handle is limited. As shown in FIG. 4, for example, Company A's model 100 drive apparatus 101 can only record to DVD-R and DVD-RW, while Company B's model 101 drive apparatus can only record to DVD+R and DVD+RW. Also, Company C's model 103 drive apparatus can only record to DVD-RAM.

However, the optical disk apparatus 1 can handle any type of optical disk as a result of the user interchanging drive apparatuses. For example, by interchanging Company A's model 100 drive apparatus 101, Company B's model 101 drive apparatus, and Company C's model 103 drive apparatus, the optical disk apparatus 1 is able to perform reading and recording of DVD-RAM, DVD-R, DVD-RW, DVD+R, and DVD+RW.

In this way, the optical disk apparatus 1 is able to handle any type of optical disk by making the drive apparatuses detachable. Therefore, the user is able to perform reading and recording of data to optical disk in his or her optical disk apparatus 1, whatever the type of optical disk. Consequently, the user no longer has to worry about the type of optical disk his or her optical disk apparatus 1 can handle.

An optical disk apparatus according to another embodiment of the present invention is described below.

Figure 6:
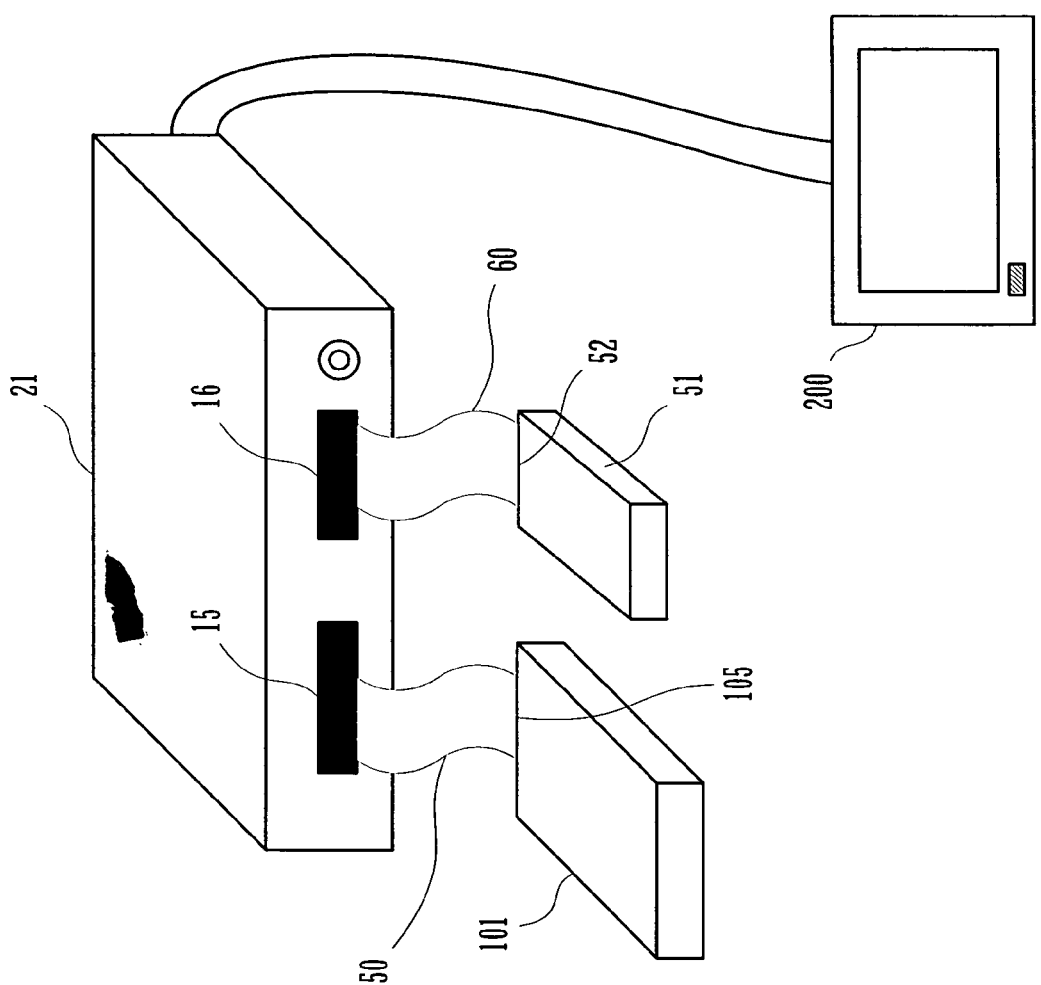
FIG. 6 shows an overview in which a drive apparatus is connected to an optical disk apparatus according to another embodiment of the present invention.

FIG. 6 shows an overview in which a drive apparatus is connected to this optical disk apparatus.

An optical disk apparatus 21 differs in comparison to the optical disk apparatus 1 due to the inclusion of an input/output (I/O) port 16 whose interface standard is ATA.

A hard disk (HD) drive apparatus 51 is a general-purpose HD drive apparatus used with personal computers (PCs). The HD drive apparatus 51 includes a port 52 whose interface standard is ATA. The HD drive apparatus 51 records data and reads recorded data with respect to a hard disk, by controlling a magnetic head to access the hard disk.

The I/O port 16 of the optical disk apparatus 21 is connected to the port 52 of the HD drive apparatus 51 by an ATA cable 60.

A storage unit 6 prestores a table. The table stores manufacturing information relating to manufacture of an HD drive apparatus and a plurality of device drivers corresponding to the manufacturing information, one of the device drivers controlling a playback (reading) operation or a recording operation of the HD drive apparatus from the optical disk apparatus 1.

The operation of the optical disk apparatus 21 is substantially similar to FIG. 5.

Any HD drive apparatus can thus be connected to the optical disk apparatus 21 provided the interface standard is ATA, the same as the I/O port 16 of the optical disk apparatus 21. In other words, the HD drive apparatus 51 is detachable (removable) from the optical disk apparatus 21. The optical disk apparatus 21, therefore, achieves similar effects to the optical disk apparatus 1.

Note that although ATA is given as the interface standard in the present embodiment, USB, SCSI and the like are also acceptable.

What is claimed is:

1. An optical disk apparatus comprising:
a first input/output port that connects to a port of an optical drive apparatus for loading an optical disk;
a storage unit that prestores manufacturing information relating to manufacture of the optical drive apparatus, a plurality of device drivers, and type information indicating a plurality of types of optical disks that the optical drive apparatus can handle, in such a manner as to correspond to each other, one of the device drivers controlling, from the optical disk apparatus, a reading operation or a recording operation of the optical drive apparatus for the optical disk;

an on screen display (OSD) processing unit connected to a display device that displays an image based on an image signal; and a controller configured to detect whether the optical drive apparatus is connected to the first input/output port when reading or recording of data for the optical disk is instructed, wherein the controller:
commands the optical drive apparatus to transmit manufacturing information via the first input/output port when detecting connection of the optical drive apparatus to the first input/output port; and extracts, when receiving the manufacturing information via the first input/output port from the optical drive apparatus, from the storage unit a device driver and a type of optical disk which corresponds to the receiving manufacturing information, wherein the OSD processing unit outputs to the display device an OSD image signal indicating the type of optical disk extracted by the controller, and wherein the controller controls the reading operation or the recording operation of the optical drive apparatus for the optical disk, based on the extracted device driver.

2. The optical disk apparatus according to claim 1, wherein an interface standard of the first input/output port is one of ATA (AT Attachment)/ATAPI (AT Attachment Packet Interface)-4, ATAPI (AT Attachment Packet Interface), and USB (Universal Serial Bus).

3. The optical disk apparatus according to claim 1, further comprising a second input/output port that connects to a port of a hard disk drive apparatus having a hard disk, wherein the controller:
detects whether the hard disk drive apparatus is connected to the second input/output port when reading or recording of data for the hard disk is instructed;

commands the hard disk drive apparatus to transmit manufacturing information via the second input/output port when detecting connection of the hard disk drive apparatus to the second input/output port;

extracts, when receiving the manufacturing information via the second input/output port from the hard disk drive apparatus, from the storage unit a device driver which corresponds to the receiving manufacturing information; and controls the reading operation or the recording operation of the hard disk drive apparatus for the hard disk, based on the extracted device driver.

4. The optical disk apparatus according to claim 1, wherein the manufacturing information shows model number of the optical drive apparatus.

* * * * *